(12) United States Patent
Nakagawa et al.

(10) Patent No.: US 9,327,356 B2
(45) Date of Patent: May 3, 2016

(54) TOOTH FLANK MACHINING DEVICE AND GEAR MANUFACTURING METHOD

(71) Applicants: AISIN AI CO., LTD., Nishio-shi (JP); AI MACHINE TECH CO., LTD., Anjo-shi (JP)

(72) Inventors: Fumio Nakagawa, Anjo (JP); Kazuhiko Muramatsu, Nishio (JP); Daisuke Tanaka, Anjo (JP); Takaaki Kato, Anjo (JP); Futoshi Okada, Anjo (JP); Hiromasa Tsuji, Nishio (JP)

(73) Assignees: AISIN AI CO., LTD, Nishio-Shi, Aichi (JP); AI MACHINE TECH CO., LTD., Anjo-Shi, Aichi (JP)

( * ) Notice: Subject to any disclaimer, the term of this patent is extended or adjusted under 35 U.S.C. 154(b) by 0 days.

(21) Appl. No.: 14/404,421

(22) PCT Filed: Oct. 25, 2012

(86) PCT No.: PCT/JP2012/006868
§ 371 (c)(1),
(2) Date: Nov. 26, 2014

(87) PCT Pub. No.: WO2013/183094
PCT Pub. Date: Dec. 12, 2013

(65) Prior Publication Data
US 2015/0118938 A1   Apr. 30, 2015

(30) Foreign Application Priority Data
Jun. 6, 2012 (JP) ................ 2012-128742

(51) Int. Cl.
*B24B 53/07* (2006.01)
*B23F 5/04* (2006.01)
(Continued)

(52) U.S. Cl.
CPC .............. *B23F 5/04* (2013.01); *B23F 23/1225* (2013.01); *B24B 49/10* (2013.01); *B24B 53/075* (2013.01)

(58) Field of Classification Search
CPC ....... B23F 5/04; B23F 23/1235; B24B 49/00; B24B 53/075
USPC ...................................... 451/5, 47
See application file for complete search history.

(56) References Cited

U.S. PATENT DOCUMENTS 2,385,650 A * 9/1945 Rickenmann ............. B23F 5/04
409/12
3,207,039 A * 9/1965 Deakin .................... B23F 9/10
409/27

(Continued)

FOREIGN PATENT DOCUMENTS

CN   1689760 A   11/2005
CN   1721114 A   1/2006

(Continued)

OTHER PUBLICATIONS

International Search Report (PCT/ISA/210) mailed on Nov. 27, 2012, by the Japanese Patent Office as the International Searching Authority for International Application No. PCT/JP2012/006868.

(Continued)

*Primary Examiner* — George Nguyen
(74) *Attorney, Agent, or Firm* — Buchanan Ingersoll & Rooney PC

(57) ABSTRACT

A tooth flank machining device includes a helical teeth grinding wheel, a position adjusting unit] capable of moving a relative position of a rotational axis of the helical teeth grinding wheel to a rotational axis of a work gear, and a controlling unit having a relative position controller activating the position adjusting unit to adjust the relative position of the rotational axis of the helical teeth grinding wheel to the rotational axis of the work gear so that the helical teeth grinding wheel engages the work gear with a grinding wheel tooth flank of the helical teeth grinding wheel abutting on only one of work tooth flanks forming a tooth of the work gear, a grinding wheel rotating unit controller activating a grinding wheel rotating unit, and a torque controlling unit controller activating a rotational torque controlling unit to adjust rotational torque within a predetermined range.

16 Claims, 13 Drawing Sheets

(51) Int. Cl.
*B23F 23/12* (2006.01)
*B24B 53/075* (2006.01)
*B24B 49/10* (2006.01)

(56) References Cited

U.S. PATENT DOCUMENTS

| | | | | |
|---|---|---|---|---|
| 3,602,209 A * | 8/1971 | Bocker | ............... | B24B 53/083 125/11.03 |
| 3,897,661 A | 8/1975 | Inatomi et al. | | |
| 4,757,644 A * | 7/1988 | Erhardt | ............... | B23F 5/163 219/69.2 |
| 5,651,721 A * | 7/1997 | Schriefer | ............. | B23F 19/057 451/11 |
| 6,379,217 B1 * | 4/2002 | Thyssen | .................... | B23F 5/04 451/5 |
| 6,422,924 B1 * | 7/2002 | Faulstich | ............. | B23F 19/007 451/147 |
| 7,341,501 B2 * | 3/2008 | Yanase | ................ | B23F 23/1225 451/10 |
| 7,682,222 B2 * | 3/2010 | Baldeck | ................ | B23F 17/00 451/11 |
| 8,087,974 B2 * | 1/2012 | Maeda | .................... | B23F 11/00 451/147 |
| 8,323,073 B2 * | 12/2012 | Vucetic | .................... | B23F 1/02 409/66 |
| 8,926,403 B2 * | 1/2015 | Mueller | ............. | B23F 23/1225 451/443 |
| 9,114,466 B2 * | 8/2015 | Mueller | .................... | B23F 5/04 |
| 2005/0245176 A1 | 11/2005 | Thyssen | | |
| 2006/0014474 A1 | 1/2006 | Yanase et al. | | |
| 2006/0025050 A1 * | 2/2006 | Yanase | ................ | B23F 23/1225 451/5 |
| 2006/0073765 A1 * | 4/2006 | Noda | ........................ | B24B 7/00 451/5 |
| 2008/0264401 A1 | 10/2008 | Lopez | | |
| 2011/0151756 A1 | 6/2011 | Rudolf | | |
| 2012/0009848 A1 * | 1/2012 | Heidelmann | ............. | B23F 1/02 451/5 |

FOREIGN PATENT DOCUMENTS

| | | |
|---|---|---|
| CN | 101293290 A | 10/2008 |
| CN | 102114612 A | 7/2011 |
| JP | 46-29719 Y1 | 8/1971 |
| JP | 49-3296 A | 1/1974 |
| JP | 6-126530 A | 5/1994 |
| JP | 2005-313320 A | 11/2005 |
| JP | 2011-031317 A | 2/2011 |
| JP | 2011-126006 A | 6/2011 |

OTHER PUBLICATIONS

Japanese Office Action issued Feb. 2, 2016, by the Japan Patent Office, in corresponding Japanese Patent Application No. 2012-128742 with English-language translation of Japanese Office Action. (8 pages).

Chinese Office Action issued Feb. 15, 2016, by the Chinese Patent Office, in corresponding Chinese Patent Application No. 201280073517.2 with English language translation (20 pages).

* cited by examiner

CONVENTIONAL FORMING METHOD (A)    CONVENTIONAL FORMING METHOD (B)

TOOTH FLANK MACHINING DEVICE AND GEAR MANUFACTURING METHOD

CROSS REFERENCE TO RELATED APPLICATIONS

The present application is a U.S. national phase application under 35 U.S.C. §371 of PCT Application No. PCT/JP2012/006868, filed on Oct. 25, 2012, and claims priority to and incorporates by reference Japanese Patent Application No. 2012-128742, filed on Jun. 6, 2012.

TECHNICAL FIELD

The present invention relates to tooth flank machining devices and gear manufacturing methods, and particularly relates to a tooth flank machining device and a gear manufacturing method for finishing a tooth flank of a high-hardness gear using a helical teeth grinding wheel.

BACKGROUND ART

It is known that a gear tooth flank with an improved surface roughness (lower surface roughness) has better durability and transmission efficiency, and makes little noise.

The prevailing method for finishing a tooth flank of a high-hardness gear is a highly efficient gear grinding method in which opposite tooth flanks of a work gear are finished simultaneously while the work gear is being forcibly rotated synchronously with flank surfaces of a threaded grinding wheel rotating at a high speed. In the gear grinding method, a flank surface of a grinding wheel (grinding wheel tooth flank) engages a tooth flank of a work gear without any gap therebetween (zero backlash). Accordingly, cutting speed of the grinding wheel can be controlled, whereas machining pressure on the work surface is difficult to be controlled. As a result, the pressure on the work point on the tooth flank fluctuates depending on machining conditions or machining circumstances (e.g., sharpness and clogging of the grinding wheel, and machining allowance), which sometimes generates a high pressure beyond the limit of the work gear, possibly leading to a grinding burn and a crack on the tooth flank of the work gear, or damage to the grinding wheel.

In a conventional gear grinding method, even if a finishing grinding wheel (soft or fine polishing powder) is used to lower the surface roughness of the tooth flank, because the method is performed under a zero backlash condition, which makes it difficult to control the machining pressure, the grinding wheel may be damaged, and thus the method has limitations in lowering the surface roughness. That is, for lowering the surface roughness, it is desired to control the machining pressure to achieve an appropriate machining speed.

Other tooth flank finishing methods include the gear honing method. However, as in the Patent Literature 1, in the method, tooth flanks of a grinding wheel engage a gear under zero backlashes to simultaneously finish opposite tooth flanks of the gear. This makes it difficult to finely control machining pressure between the tooth flanks of the grinding wheel and the tooth flanks of the work gear.

CITATION LIST

Patent Literature

Patent Literature 1: JP 6-126530 A

SUMMARY OF INVENTION

Technical Problem

The present invention has been made in view of the above circumstances, and aims to provide a tooth flank machining device and a gear manufacturing method in which machining pressure is regulated for improving the surface roughness of a high-hardness gear.

Solution to Problem

To solve the above problems, a tooth flank machining device of the present invention includes: a helical teeth grinding wheel supported so as to be rotatable about a rotational axis; a work gear supporting unit supporting a work gear so as to be rotatable about a rotational axis; a position adjusting unit capable of moving a relative position of the rotational axis of the helical teeth grinding wheel to the rotational axis of the work gear; a grinding wheel rotating unit rotating the helical teeth grinding wheel; a rotational torque controlling unit controlling rotational torque of the work gear; and a controlling unit having a relative position controller activating the position adjusting unit to adjust the relative position of the rotational axis of the helical teeth grinding wheel to the rotational axis of the work gear so that the helical teeth grinding wheel engages the work gear with a grinding wheel tooth flank of the helical teeth grinding wheel abutting on only one of work tooth flanks forming a tooth of the work gear, a grinding wheel rotating unit controller activating the grinding wheel rotating unit, and a torque controlling unit controller activating the rotational torque controlling unit to adjust the rotational torque within a predetermined range.

Here, the helical teeth grinding wheel includes a threaded grinding wheel having a larger tooth angle. The threaded grinding wheel has one or two or more threads.

In the tooth flank machining device of the present invention, the helical teeth grinding wheel may be made of a deformable elastic material in order for the grinding wheel tooth flank to comply with a shape of the work tooth flank.

In the tooth flank machining device of the present invention, the grinding wheel rotation controller may rotate the grinding wheel rotating unit, and the rotational torque controlling unit controller may switch the direction of the rotational torque to rotate the work gear into one direction and the other and machines the one and the other work tooth flanks of the work gear.

In the tooth flank machining device of the present invention, the helical teeth grinding wheel preferably has a tooth thickness smaller than a width of a tooth space of the work gear.

In the tooth flank machining device of the present invention, the controlling unit can have a vibration controller activating the position adjusting unit to vibrate the helical teeth grinding wheel and/or the work gear.

The tooth flank machining device of the present invention includes a grinding wheel dresser having a shape of at least a pair of adjacent peaks, and forming and dressing the grinding wheel tooth flank while restraining a peak of the grinding wheel with a valley formed by the pair of peaks.

In the tooth flank machining device of the present invention, both end surfaces of the grinding wheel dresser may have cylinder shaping portions formed thereon which are equal to a small diameter of the work gear.

In the tooth flank machining device of the present invention, the work gear supporting unit rotatably supporting the work gear may be provided with a torsion buffer generating an amount of torsion.

Also, to solve the above problems, a gear manufacturing method of the present invention uses a machining device including a helical teeth grinding wheel supported so as to be rotatable about a rotational axis and a work gear supporting unit supporting a work gear so as to be rotatable about a rotational axis, and the method includes: a position adjusting step adjusting a relative position of the rotational axis of the helical teeth grinding wheel to the rotational axis of the work gear so that the helical teeth grinding wheel engages the work gear with a grinding wheel tooth flank of the helical teeth grinding wheel abutting on only one of work tooth flanks forming a tooth of the work gear; a grinding wheel rotating step rotating the helical teeth grinding wheel; and a rotational torque controlling step adjusting rotational torque of the work gear within a predetermined range in the course of the grinding wheel rotating step.

The grinding wheel rotating step may start after the completion of, in the course of, or before starting the position adjusting step.

In the gear manufacturing method of the present invention, the helical teeth grinding wheel may be made of a deformable elastic material in order for the grinding wheel tooth flank to comply with a shape of the work tooth flank.

In the gear manufacturing method of the present invention, the helical teeth grinding wheel may be rotated in the grinding wheel rotating step, and the direction of the rotational torque may be switched to rotate the work gear into one direction and the other, thereby machining the one and the other work tooth flanks of the work gear in the rotational torque controlling step.

In the gear manufacturing method of the present invention, the helical teeth grinding wheel preferably has a tooth thickness smaller than a width of a tooth space of the work gear.

In the gear manufacturing method of the present invention, in the grinding wheel rotating step, the helical teeth grinding wheel and/or the work gear may be vibrated, and further a vibrating step changing the relative position of the rotational axis of the helical teeth grinding wheel to the rotational axis of the work gear may be performed.

In the gear manufacturing method of the present invention, by using a grinding wheel dresser having a shape of at least a pair of adjacent peaks, a grinding wheel dressing step forming and dressing the grinding wheel tooth flank while restraining a peak of the grinding wheel with a valley formed by the pair of peaks may be performed.

In the gear manufacturing method of the present invention, both end surfaces of the grinding wheel dresser may have cylinder shaping portions formed thereon which are equal to a small diameter of the work gear, and the grinding wheel dressing step may include forming and dressing the grinding wheel tooth flank using the cylinder shaping portions.

In the gear manufacturing method of the present invention, the work gear supporting unit rotatably supporting the work gear may be provided with a torsion buffer generating an amount of torsion.

Advantageous Effects of Invention

In a tooth flank machining device of the present invention, a helical teeth grinding wheel engages a work gear with a grinding wheel tooth flank of the helical teeth grinding wheel abutting on only one of work tooth flanks forming a tooth of the work gear while the other work tooth flank not abutting on a grinding wheel tooth flank, and then a grinding wheel rotating unit rotates the helical teeth grinding wheel. That is, since the other work tooth flank of the work gear is not in contact with the grinding wheel tooth flank, the helical teeth grinding wheel rotates with a gap between the other work tooth flank and the grinding wheel tooth flank. This makes it easier to control the machining pressure between the grinding wheel tooth flank and the work tooth flank. The machining pressure is controlled by a rotational torque controlling unit controlling the rotational torque of the work gear. This allows improvement in surface roughness of the work tooth flank of the work gear while avoiding a grinding burn and a crack of the work gear, or damage to the grinding wheel.

A gap between the grinding wheel tooth flank and the work tooth flank makes it easier to change the relative position of a rotational axis of the helical teeth grinding wheel to a rotational axis of the work gear. This allows the work tooth flank to be machined considering a gear which the work gear is to actually engage.

According to the present invention, an elastic material is employed as the helical teeth grinding wheel in order for the grinding wheel tooth flank to comply with the shape of the work tooth flank. This makes it easier to control the machining pressure without being affected by the precision in the preceding processes, thereby avoiding a grinding burn and a crack of the work gear, or damage to the grinding wheel. That is, deformable grinding wheel deforms along unevenness on the tooth flank caused in the preceding processes which might otherwise vary the machining pressure, thereby hardly affected by the precision in the preceding processes.

According to the present invention, the rotational torque of the work gear is switched while rotating the helical teeth grinding wheel at a constant speed, which allows both work tooth flanks forming a peak of the work gear to be machined one tooth flank at a time without remounting the work gear or the helical teeth grinding wheel with a different orientation. In general, high torque is required to quickly reverse the rotation direction of the helical teeth grinding wheel. In the present invention, however, it is only required to reverse the direction of the rotational torque of the rotational torque controlling unit while rotating the helical teeth grinding wheel in one direction at a constant speed. Since reversing the torque by the rotational torque controlling unit is achieved with low torque, the device as a whole does not require a high output motor, thereby downsizing the entire device including a motor.

According to the present invention, the helical teeth grinding wheel has a tooth thickness smaller than a width of a tooth space of the work gear. This makes it easier to adjust the relative position of the helical teeth grinding wheel to the work gear, enabling the grinding wheel tooth flank to abut on only one of the work tooth flanks forming a peak of the work gear more reliably.

According to the present invention, the controlling unit activates the position adjusting unit to vibrate the helical teeth grinding wheel and/or the work gear, thereby changing the relative position of the work gear to the helical teeth grinding wheel. This allows the work tooth flank to be machined considering a gear which the work gear is to actually engage.

According to the present invention, a valley formed by a pair of adjacent peaks of the grinding wheel dresser sandwiches a peak of the grinding wheel, and thus the peak of the grinding wheel is hardly deformed by forming and dressing. Therefore the grinding wheel dresser especially effectively forms and dresses the grinding wheel when the grinding wheel is made of a deformable elastic material in order for the grinding wheel tooth flank to comply with the shape of the work tooth flank.

According to the present invention, both end surfaces of the grinding wheel dresser have cylinder shaping portions formed thereon which are equal to a small diameter of the work gear. This enables the grinding wheel dresser to form and dress the grinding wheel further effectively.

According to the present invention, the work gear supporting unit rotatably supporting the work gear is provided with a torsion buffer generating an amount of torsion. This provides capabilities to measure torque of the gear shaft and to store torque therein for measurement of machining load (torque) on the tooth flank and for more stable machining load (torque).

In the gear manufacturing method according to the present invention, a grinding wheel tooth flank of the helical teeth grinding wheel abuts on only one of work tooth flanks forming a tooth of the work gear in the position adjusting step, and the helical teeth grinding wheel is rotated in the grinding wheel rotating step. Thus, the other work tooth flank of the work gear is not in contact with the grinding wheel tooth flank, thereby ensuring a gap while machining the work tooth flank. This makes it easier to control the machining pressure between the grinding wheel tooth flank and the work tooth flank. The machining pressure is controlled by adjusting the rotational torque of the work gear within a predetermined range in the rotational torque controlling step. This allows improvement in surface roughness of the work tooth flank of the work gear while avoiding a grinding burn and a crack of the work gear, or damage to the grinding wheel.

A gap between the grinding wheel tooth flank and the work tooth flank makes it easier to change the relative position of the helical teeth grinding wheel to the work gear. This allows the work tooth flank to be machined considering a gear which the work gear is to actually engage.

According to the present invention, a deformable elastic material is employed for the helical teeth grinding wheel in order for the grinding wheel tooth flank to comply with the shape of the work tooth flank. This makes it easier to control the machining pressure without being affected by the precision in the preceding processes, thereby avoiding a grinding burn and a crack of the work gear, or damage to the grinding wheel.

According to the present invention, the helical teeth grinding wheel is rotated in one direction in the grinding wheel rotating step and the rotational torque of the work gear is switched in the rotational torque controlling step, which allows both work tooth flanks forming a peak of the work gear to be machined one tooth flank at a time without remounting the work gear or the helical teeth grinding wheel with a different orientation. In general, high torque is required to quickly reverse the rotation direction of the helical teeth grinding wheel. In the present invention, however, it is only required to reverse the direction of the rotational torque of the rotational torque controlling unit while rotating the helical teeth grinding wheel in one direction at a constant speed. Since reversing the torque by the rotational torque controlling unit is achieved with low torque, the device as a whole does not require a high output motor, thereby downsizing the entire device including a motor.

According to the present invention, the helical teeth grinding wheel has a tooth thickness smaller than a width of a tooth space of the work gear. Accordingly, the grinding wheel tooth flank abuts on only one of the work tooth flanks forming a peak of the work gear more reliably.

According to the present invention, the relative position of the rotational axis of the work gear to the rotational axis of the helical teeth grinding wheel can be changed in the vibrating step. This allows the work tooth flank to be machined considering a gear which the work gear is to actually engage.

According to the present invention, by using a grinding wheel dresser having a shape of at least a pair of adjacent peaks, the grinding wheel dressing step is performed which forms and dresses the grinding wheel tooth flank while restraining a peak of the grinding wheel with a valley formed by the pair of peaks. Therefore, the grinding wheel dresser effectively forms and dresses the grinding wheel.

According to the present invention, both end surfaces of the grinding wheel dresser have cylinder shaping portions formed thereon which are equal to a small diameter of the work gear, and the grinding wheel dressing step includes a process of forming and dressing the grinding wheel tooth flank using the cylinder shaping portions. Therefore, the grinding wheel dresser further effectively forms and dresses the grinding wheel.

According to the present invention, the work gear supporting unit rotatably supporting the work gear is provided with a torsion buffer generating an amount of torsion. This provides capabilities to measure torque of the gear shaft and to store torque therein for measurement of machining load (torque) on the tooth flank and for more stable machining load (torque).

DESCRIPTION OF EMBODIMENTS

Typical embodiments of the present invention will be described with reference to FIGS. 1 to 9(c). A tooth flank machining device and a gear manufacturing method according to the embodiment is used to machine tooth flanks of a spur or a helical gears as a work gear W. The machining method used in the embodiment machines tooth flanks one by one, where the machining degree is insignificant. The tooth flank machining device and the gear manufacturing method according to the embodiment can be applied to, for example, grinding, honing, and superfinishing methods, or to shaving method, where a grinding wheel is used instead of a cutter.

[First Embodiment]

Figure 1:
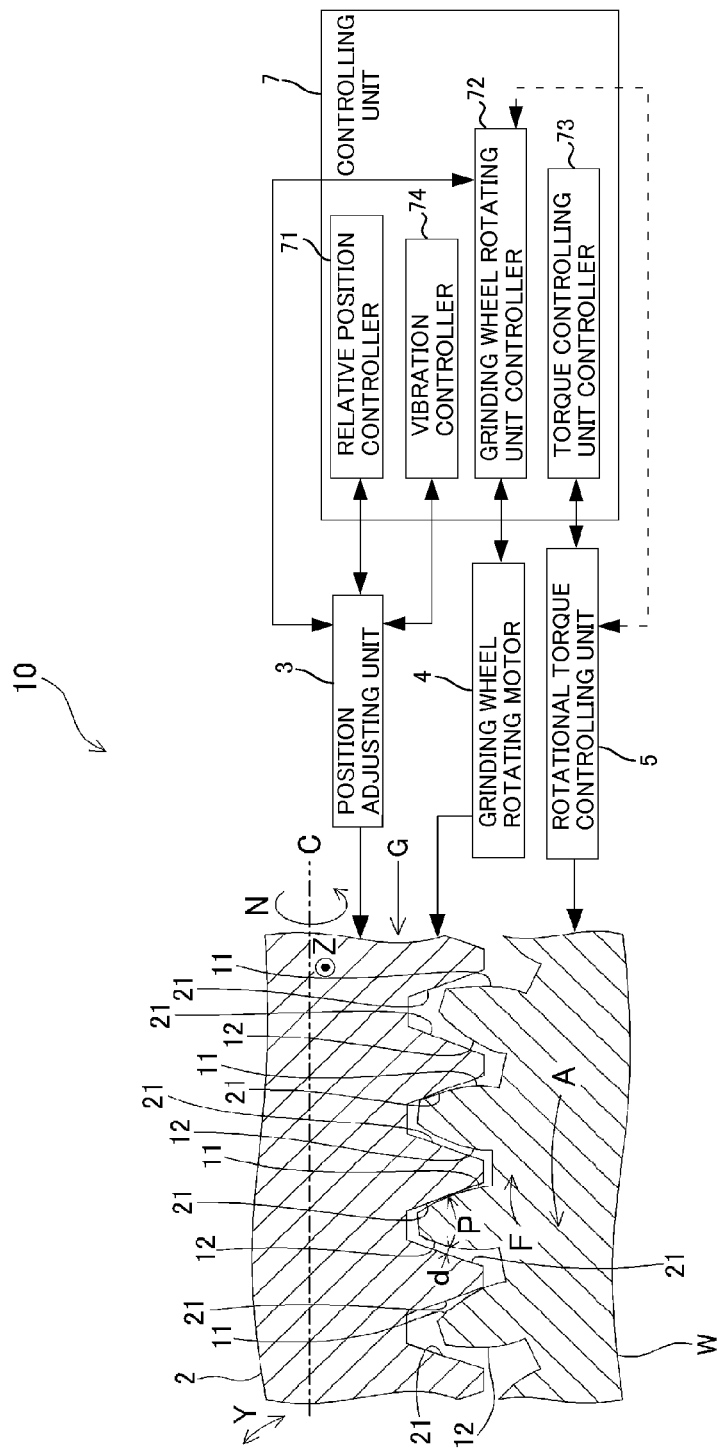
FIG. 1 is a view explaining the configuration of a tooth flank machining device 10 of a first embodiment.

A tooth flank machining device 10 of the first embodiment includes a grinding wheel (helical teeth grinding wheel) 2, a position adjusting unit 3, a grinding wheel rotating motor (grinding wheel rotating unit) 4, a rotational torque controlling unit 5, and a controlling unit 7, as shown in FIG. 1.

A threaded grinding wheel which is a helical teeth grinding wheel with larger tooth angle is used as the grinding wheel 2. The grinding wheel 2 is made of a deformable elastic material in order for a grinding wheel tooth flank 21 to comply with the shape of a work tooth flank 11 of a work gear W. The tooth thickness of the grinding wheel 2 is smaller than the width of the tooth space of the work gear W. The grinding wheel 2 is supported by a mounting base (not shown) so as to be rotatable about the rotational axis C.

The grinding wheel rotating motor 4 rotates the grinding wheel 2 about the rotational axis C via a reduction mechanism (not shown, not always necessary).

Figure 2:
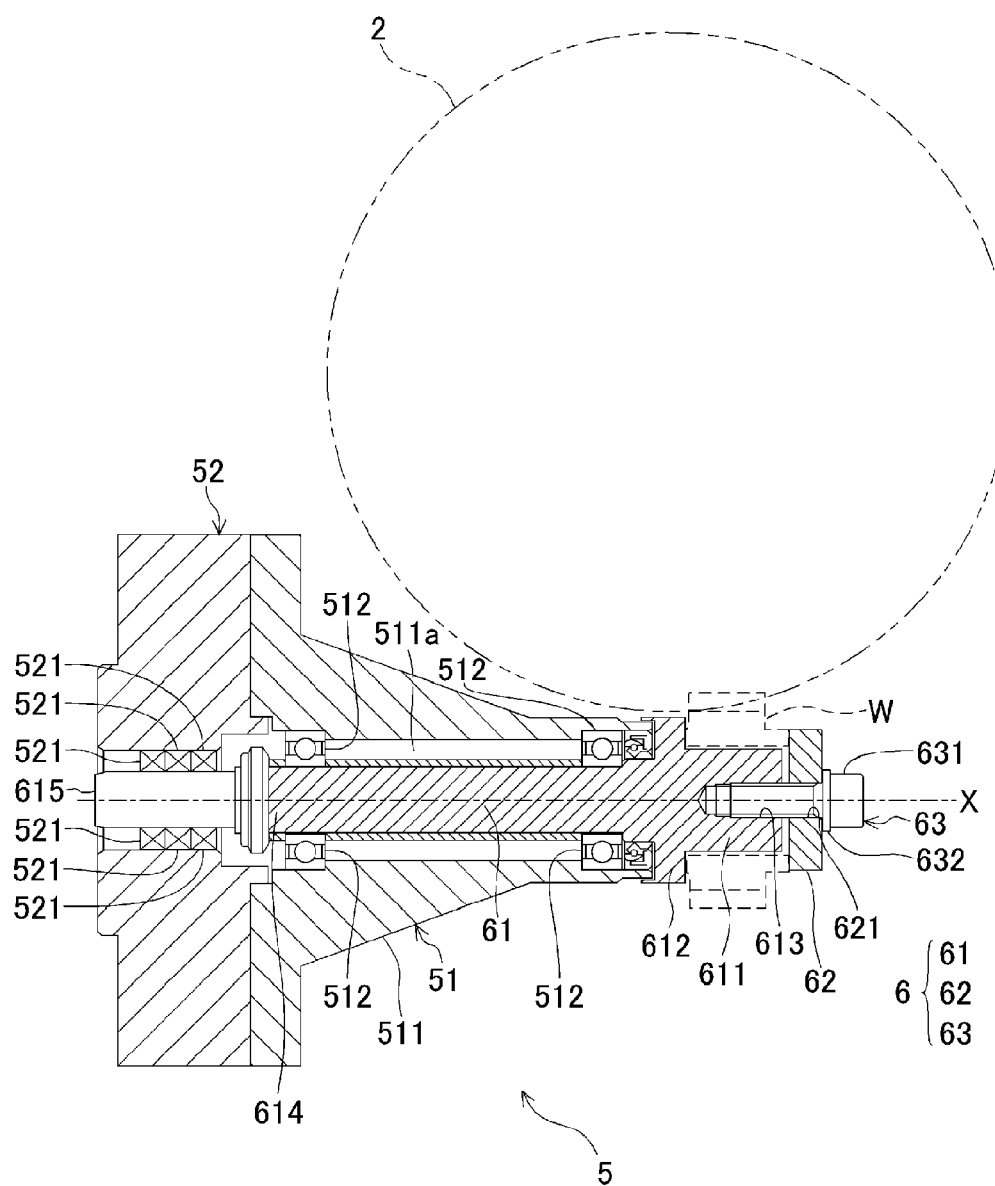
FIG. 2 is a partial cross-sectional view of a rotational torque controlling unit 5 used in the tooth flank machining device 10 of the first embodiment, the view showing the configuration of the unit.

As shown in FIG. 2, the rotational torque controlling unit 5 includes a work gear supporting unit 6, a holding member 51, and an adjusting member 52. The work gear supporting unit 6 includes a shaft 61 having an end 611 inserted into the work gear W, a pressing member 62 clamping the work gear W from both sides with a flange 612 of the shaft 61, and a fastening member 63 penetrating through the center of the pressing member 62 and inserted and fastened into the end 611 of the shaft 61. The end 611 inserted into the inner circumference of the work gear W has a screw hole 613 which opens in the axial direction and into which the fastening member 63 is inserted and fastened. The pressing member 62 has at the center a through hole 621 which communicates with the screw hole 613 of the shaft 61 when the member 62 is aligned with the end 611 of the shaft 61. The fastening member 63 includes a screw 631 inserted and fastened into the through hole 621 of the pressing member 62 and the screw hole 613 of the shaft 61, and a washer 632 placed between the screw 631 and the pressing member 62. The shaft 61 of the work gear supporting unit 6 is rotatably held by the holding member 51 at a portion except for the end 611 inserted into the work gear W and a holding rotating shaft 615 attached to the other end 614 of the shaft 61. The holding member 51 includes a body 511 fixed to a seat (not shown), and a bearing 512. The body 511 has a through hole 511a formed therein through which the shaft 61 is inserted and rotatably holds the shaft 61 (work gear supporting unit 6) via the bearing 512. The work gear W is put on the shaft 61 of the work gear supporting unit 6 rotatably supported by the holding member 51, the pressing member 62 is aligned with the end 611 of the shaft 61 and fastened by the fastening member 63, and thus the work gear W is supported such that the gear W is rotatable in conjunction with the work gear supporting unit 6 about a rotational axis X.

The adjusting member 52 is provided to the holding rotating shaft 615 of the work gear supporting unit 6 inserted into the work gear W. Rotational torque of the work gear W is adjusted to a predetermined range, for example, by inserting the holding rotating shaft 615 through some oil seals 521.

Figure 3:
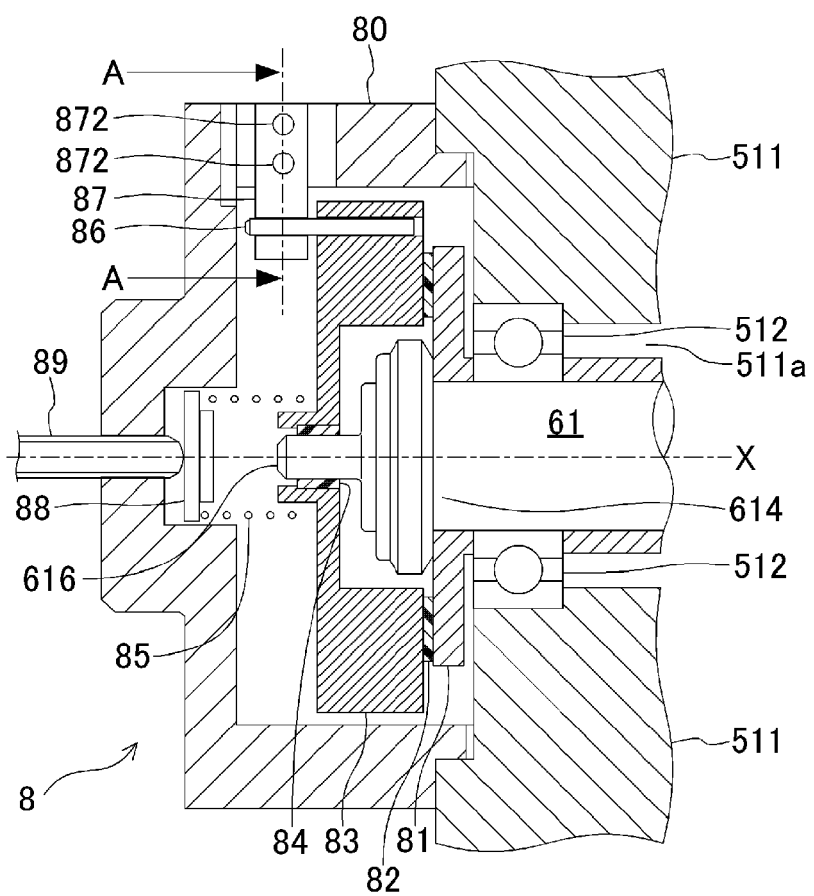
FIG. 3 is a partial cross-sectional view of an adjusting member 8 used in the tooth flank machining device 10 of the first embodiment, the view showing the configuration of the member.
Figure 4:
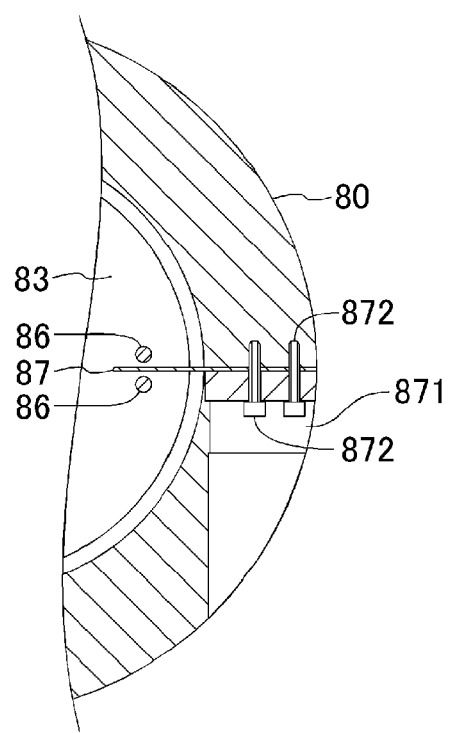
FIG. 4 is a cross-sectional view taken along line A-A of FIG. 3.

FIGS. 3 and 4 show an adjusting member 8 adjusting rotational torque of the work gear W using other than the oil seals 521. A first disk 81 rotating in conjunction with the shaft 61 is fit around the outer circumference of the other end 614 of the shaft 61 opposite to the end 611 inserted into the work gear W. A second disk 83 is placed around the outer circumference of a holding rotating shaft 616 fixed to the other end 614 such that the second disk 83 is rotatable relative to the first disk 81 via a friction material 82. The friction material 82 has a ring shape and positioned between the first disk 81 and the second disk 83 in the axial direction of the shaft 61. In the embodiment, although the friction material 82 is affixed to the surface of the second disk 83 (a face abutting on the first disk 81), it maybe affixed to the surface of the first disk 81 (a face abutting on the second disk 83) or to both of the first and second disks 81 and 83. The shape of the friction material 82 is not limited to a ring shape, and a plurality of friction materials 82 may be arranged at an appropriate interval in the circumferential direction (at regular or irregular interval).

On a portion of the outer circumference of the second disk 83, two rod-like stoppers 86 are placed side by side in the circumferential direction. The stoppers 86 are fitted in the second disk 83 at one ends so that the axes thereof are oriented in the axial direction of the shaft 61. The other ends of the stoppers 86 extend from the second disk 83 in the axial direction, and a measurement member 87 of an elastic body is placed between the extended portions of the two stoppers 86. The measurement member 87 is fixed to a case 80 by a fastening member 872 together with an auxiliary member 871 at the outer circumference side of the second disk 83. A strain measuring instrument is attached to the measurement member 87, and the measured value is transferred to a torque controlling unit controller 73 described later. Examples of the strain measuring instrument include one that measures magnitudes of strain such as with a strain gauge or one that measures by determining a position of the measurement member 87 (relative to the position under no rotational torque) such as by an optical method, where the measurement principle and the measurement method are not particularly limited.

The second disk 83 is rotatably supported, via a bearing 84, by the holding rotating shaft 616 fixed to the other end 614 of the shaft 61 at the side opposite to the friction material 82 in the axial direction. A coil spring 85 and an auxiliary disk 88 are placed between the second disk 83 and the case 80 in the axial direction. The coil spring 85 abuts at one end on the second disk 83 and at the other end on the auxiliary disk 88, and can be extended or compressed in the axial direction. The auxiliary disk 88 is pressed in the axial direction by a torque adjusting member 89 inserted from outside the case 80 at the face opposite to the face engaging the coil spring 85.

The torque adjusting member 89 is movable in the axial direction. By moving in the axial direction, the torque adjusting member 89 adjusts the magnitude of the rotational torque applied to the work gear W, which relates to the pressure acting between the work gear W and the grinding wheel 2. For example, for increasing the rotational torque of the work gear W, the torque adjusting member 89 is moved toward the shaft 61 in the axial direction, and then the auxiliary disk 88 presses the coil spring 85 in the axial direction. The coil spring 85 loaded in the compression direction presses the second disk 83 in the axial direction, and then the friction material 82 is pressed against the first disk 81. As a result, the shaft 61 rotating in conjunction with the work gear W that rotates about the rotational axis X changes the rotational torque according to the pressing force into a direction opposite to the rotational direction, thereby increasing the rotational torque.

The torque adjusting member 89 of the embodiment has a thread (not shown) which is formed on the outer circumference thereof and threadably engages the case 80. The torque adjusting member 89 moves in the axial direction by the action of the thread as the member 89 rotates. Also, the torque adjusting member 89 is rotated by the torque controlling unit controller 73 described later. The means moving the torque adjusting member 89 in the axial direction is not limited to a thread as long as it moves in the axial direction relative to the case 80.

Returning to FIG. 1, the position adjusting unit 3 includes a feed screw (not shown) and a servomotor (not shown) engaging an end of the feed screw, and the other end of the feed screw engages the mounting base. The mounting base rotatably supports the grinding wheel 2, and is movably placed on the seat (not shown). The position adjusting unit 3 adjust a relative position of the rotational axis C of the grinding wheel 2 to the rotational axis X of the work gear W by the activation of the servomotor. Another motor, such as pulse motor, may be employed as the servomotor.

The controlling unit 7 includes a relative position controller 71, a grinding wheel rotating unit controller 72, a torque controlling unit controller 73, and a vibration controller 74. The relative position controller 71 activates the position adjusting unit 3 to adjust the relative position of the rotational axis C of the grinding wheel 2 to the rotational axis X of the work gear W so that the grinding wheel 2 engages the work gear W with the grinding wheel tooth flank 21 of the grinding wheel 2 abutting on only one of work tooth flanks 11 forming a tooth of the work gear. The position adjustment in which the grinding wheel 2 engages the work gear W with a gap d ensured between the grinding wheel tooth flank 21 and the other work tooth flank 12 of the work gear W can be performed mechanically or electrically. In the first embodiment, for example, the tooth thickness of the grinding wheel 2 is smaller than the width of the tooth space of the work gear W, so that the movement of the grinding wheel 2 and/or the work gear W stops mechanically when the tooth tip of the work gear W contacts the bottom land of the grinding wheel 2. Alternatively, the position adjustment may be such that the gap between the grinding wheel tooth flank 21 and the other work tooth flank 12 of the work gear W is measured using optical position sensor, ultrasonic distance measuring device, or optical distance measuring device, and then the position adjusting unit 3 is activated to adjust the relative position to an objective relative position based on the measurement result. Also, the position adjustment may be such that a positional relationship between the rotational axis C of the grinding wheel 2 and the rotational axis X of the work gear W which allows the gap d is calculated beforehand, and then the position of the rotational axis C of the grinding wheel 2 and/or the rotational axis X of the work gear W is adjusted to the position.

The grinding wheel rotating unit controller 72 controls the grinding wheel rotating motor 4 to switch the rotational direction of the grinding wheel 2. In FIG. 1, when the grinding wheel 2 rotates in a rotational direction N (rotational direction Z), a tooth (peak) apparently moves in the direction of arrow G as the work gear W rotates in the rotational direction A in the cross section shown in FIG. 1. Controlling of the rotation of the grinding wheel 2 is not particularly limited, but it is desirably controlled such that the grinding wheel keeps a constant circumferential velocity. Accordingly, when the grinding wheel is worn and has become small, it is desirable to keep a constant circumferential velocity such as by increasing the angular velocity of the grinding wheel 2.

The torque controlling unit controller 73 activates the rotational torque controlling unit 5 to adjust the rotational torque F of the work gear W within the predetermined range. The torque controlling unit controller 73 detects and adjusts the rotational torque F of the work gear W. The torque controlling unit controller 73 determines the rotational torque F of the work gear W based on the strain measured by the measurement member 87 of the adjusting member 8 of the rotational torque controlling unit 5. Then, the controller 73 transmits a control signal to move the torque adjusting member 89 of the adjusting member 8 in the axial direction so that the determined rotational torque F is within the predetermined range. When the detected rotational torque F is below the predetermined reference rang, the torque adjusting member 89 is moved in a direction to increase the rotational torque F, when the detected rotational torque F is over the predetermined reference range, the torque adjusting member 89 is moved in a direction to decrease the rotational torque F, and when the detected rotational torque F is within the predetermined reference range, the axial position of the torque adjusting member 89 is maintained. By controlling the rotational torque F of the work gear W, the machining pressure P between the grinding wheel tooth flank 21 and the work tooth flank 11 can be adjusted.

The vibration controller 74 activates the position adjusting unit 3 to vibrate the grinding wheel 2 and/or the work gear W, thereby changing the relative position of the rotational axis C of the grinding wheel 2 to the rotational axis X of the work gear W. For example, as shown in FIG. 1, the grinding wheel 2 is moved in a direction Y along the shape of the work tooth flank 11. The direction of the movement (vibration) is not limited, and may be a direction inclined, parallel, or orthogonal to a direction of facewidth or tooth depth of the work tooth flank 11, or they may be vibrated in a circle, but especially, they are preferably vibrated in the radial direction. The magnitude of the amplitude may be any value as long as the grinding wheel tooth flank 21 and the work tooth flank 11 vibrate in engagement, for example, 1 μm to 100 μm in the first embodiment. The grinding wheel tooth flank 21 and the work tooth flank 11 are desirably in contact with each other, and the vibration controller 74 desirably moves (vibrates) the grinding wheel 2 in a direction not changing the pressure, and further, within an acceptable range of pressure range.

In a case of imparting vibration by the position adjusting unit 3, the feed screw and the servomotor of the unit 3 itself may move and vibrate the grinding wheel 2 at an objective amplitude and frequency. Alternatively, another vibrating unit may be provided in addition to the position adjusting unit 3. Examples of the another vibrating unit include an ultrasonic wave generation unit.

Figure 5:
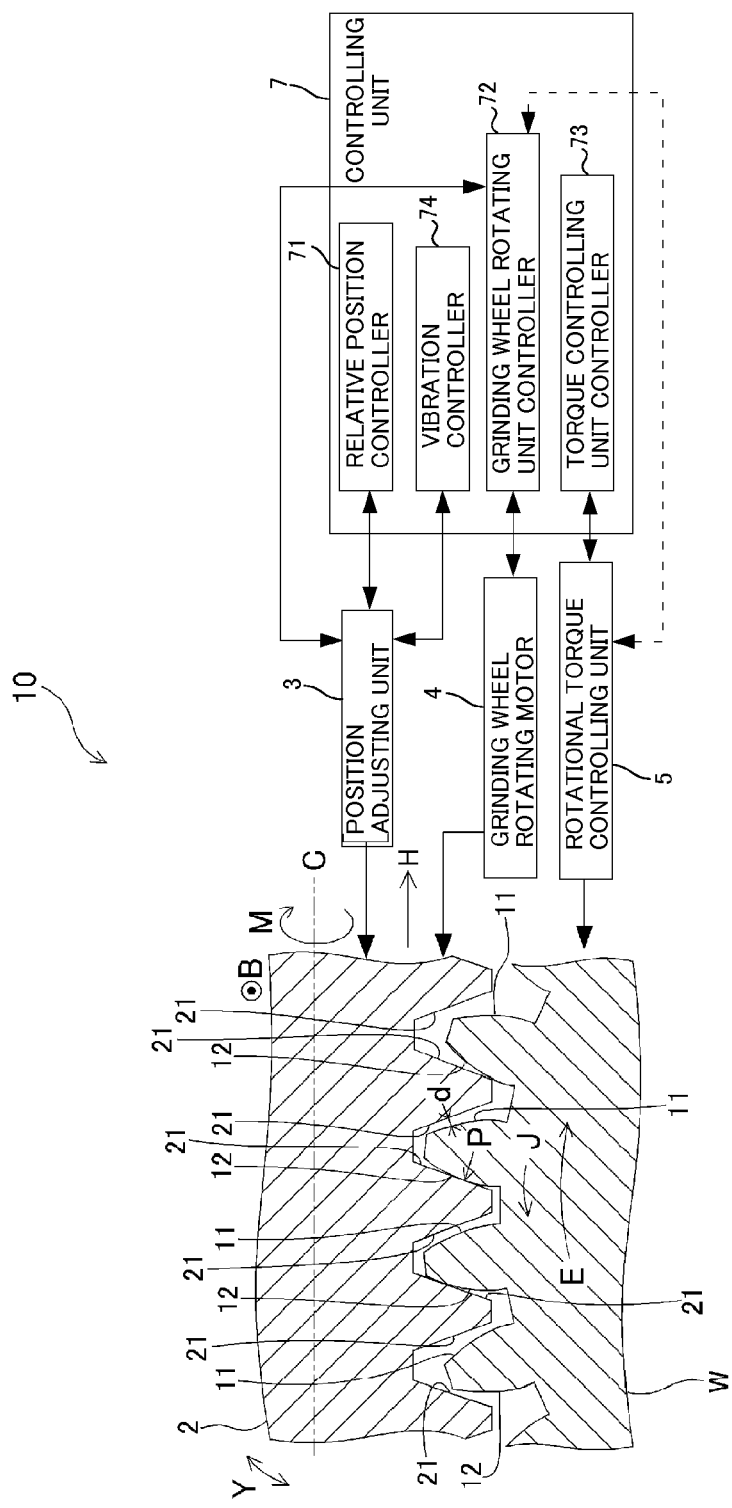
FIG. 5 is a view explaining the configuration of the tooth flank machining device 10 of the first embodiment.

After machining the work tooth flank 11, in order to machine the other work tooth flank 12 of the work gear W, the controlling unit 7 switches the direction of the rotation of the grinding wheel 2 through the grinding wheel rotating unit controller 72. FIG. 5 shows a case where the grinding wheel 2 of the tooth flank machining device 10 rotates in the reverse direction. In FIG. 5, a tooth (peak) apparently moves in the direction of arrow H as the grinding wheel 2 rotates in the rotational direction M (rotational direction B) opposite to the rotational direction N in the cross section shown in FIG. 5. Then, the other work tooth flank 12 opposite to the work tooth flank 11 of a tooth of the work gear W abuts on the grinding wheel tooth flank 21. The work gear W rotates in a rotational direction E opposite to the rotational direction A. At that time, the torque controlling unit controller 73 operates the rotational torque controlling unit 5 to adjust the rotational torque J of the work gear W within the predetermined range.

Figure 6:
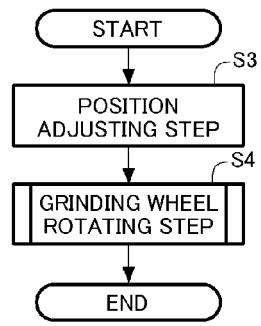
FIG. 6 is a flowchart of a gear manufacturing method performed by the tooth flank machining device 10 of the first embodiment.

FIG. 6 is a flow chart of a typical controlling method of the gear manufacturing method performed by the tooth flank machining device 10. The controlling method in the flow chart is just an example, and is not limited to this.

The gear manufacturing method includes a position adjusting step S3 and a grinding wheel rotating step S4. In the position adjusting step S3, the relative position controller 71 adjusts the relative position of the rotational axis C of the grinding wheel 2 and the rotational axis X of the work gear W so that the grinding wheel 2 engages the work gear W with the grinding wheel tooth flank 21 abutting only on the work tooth flank 11. In the grinding wheel rotating step S4, the grinding wheel rotating unit controller 72 rotates the grinding wheel 2. The grinding wheel rotating step S4 may start in the course of or before starting the position adjusting step S3. In the gear manufacturing method of the first embodiment, the position adjusting step S3 and the grinding wheel rotating step S4 may be repeated until a predetermined condition is satisfied. The predetermined condition includes that a fixed time has elapsed, that the relative position of the rotational axis C of the grinding wheel 2 to the rotational axis X of the work gear W have fallen in the predetermined range, and that a machining degree of the work tooth flank 11 has proceeded to a predetermined range.

Figure 7:
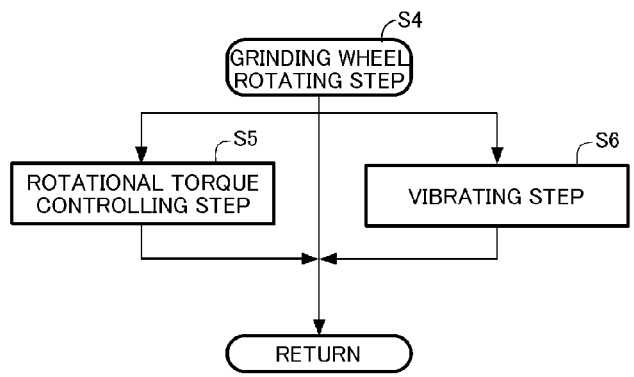
FIG. 7 is a flowchart of a grinding wheel rotating step S4 of the gear manufacturing method performed by the tooth flank machining device 10 of the first embodiment.

As shown in FIG. 7, the rotational torque controlling step S5 is performed in the course of the grinding wheel rotating step S4. In the rotational torque controlling step S5, the rotational torque controller 73 controls the activation of the rotational torque controlling unit 5 so that the rotational torque of the work gear W is adjusted into a predetermined range. A vibrating step S6 may be performed in the grinding wheel rotating step S4. In the vibrating step S6, the position adjusting unit 3 moves the grinding wheel 2 based on an operation command from the vibration controller 74. The relative position of the rotational axis C of the grinding wheel 2 to the rotational axis X of the work gear W changes as the grinding wheel 2 moves.

In the gear manufacturing method, the grinding wheel 2 is rotated and the rotational torque controlling step S5 is performed in the grinding wheel rotating step S4. In the rotational torque controlling step S5, the rotational torque of the work gear W is controlled, thereby controlling the machining pressure P between the grinding wheel tooth flank 21 and the work tooth flank 11. The vibrating step S6 can be performed optionally while the rotational torque controlling step S5 is being performed in the course of the grinding wheel rotating step S4. The shape of the work tooth flank 11 can be machined more precisely or highly efficiently by performing the vibrating step S6.

According to the gear manufacturing method performed by the tooth flank machining device 10 of the first embodiment, after processing one of the tooth flanks of the work gear W, the rotational direction of the grinding wheel 2 is switched, thereby machining the other work tooth flank. In a case where the rotational torque controlling unit 5 can impart the rotational torque also in the direction of accelerating the work gear W (for example, a motor is provided which rotates the adjusting member 52 or 8), the other work tooth flank of the work gear W can be machined by controlling the rotational torque of the work gear W to impart the rotational torque in the direction of increasing the rotational speed of the work gear W beyond that of the grinding wheel 2 in the rotational torque controlling step S5.

According to the tooth flank machining device 10 and the gear manufacturing method of the first embodiment, the grinding wheel 2 engages the work gear W such that the grinding wheel tooth flank 21 abuts on the work tooth flank 11 while having a gap d between itself and the other work tooth flank 12, and thus the machining pressure P between the grinding wheel tooth flank 21 and the work tooth flank 11 can be easily controlled. The machining pressure P is controlled, for example, by performing the rotational torque controlling step S5 and controlling the rotational torque of the work gear W with the grinding wheel rotating motor 4. Easy control of the machining pressure P allows improvement in surface roughness of the work tooth flank 11 of the work gear W while avoiding a grinding burn and a crack of the work gear W, or damage to the grinding wheel 2.

The relative position of the grinding wheel 2 to the work gear W can be easily changed because of the gap d. For example, the grinding wheel 2 is moved with the position adjusting unit 3 by performing the vibrating step S6. Thus, as the grinding wheel 2 is moved to be vibrated while rotating, the shape of the work tooth flank is machined considering a gear which the work gear W is to actually engage. The tooth flank machined considering a gear to engage actually suppresses noise.

Because the rotational direction of the grinding wheel rotating motor 4 can be switched, the other work tooth flank 12 of the work gear W can be machined without remounting the work gear W with a different orientation.

Moreover, by employing, as the grinding wheel 2, a deformable material in order for the grinding wheel tooth flank 12 to comply with the shape of the work tooth flank 11, the work tooth flank 11 can be ground along the deformed tooth flank.

[Second Embodiment]

The tooth flank machining device of a second embodiment basically has the same configurations and operation and effect as that of the tooth flank machining device 10 of the first embodiment. Different configurations and operation and effect will be mainly described hereinafter.

Figure 8:
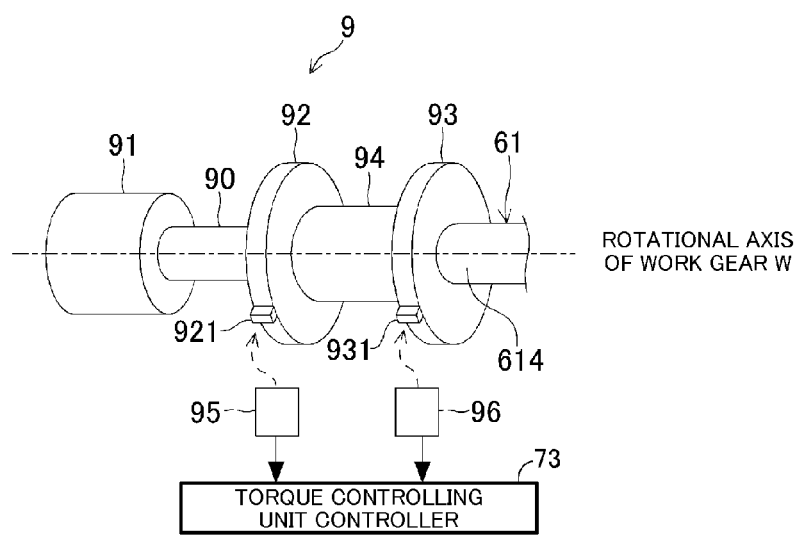
FIG. 8 is a view explaining the configuration of an adjusting member 9 used in a tooth flank machining device of a second embodiment.
Figure 9:
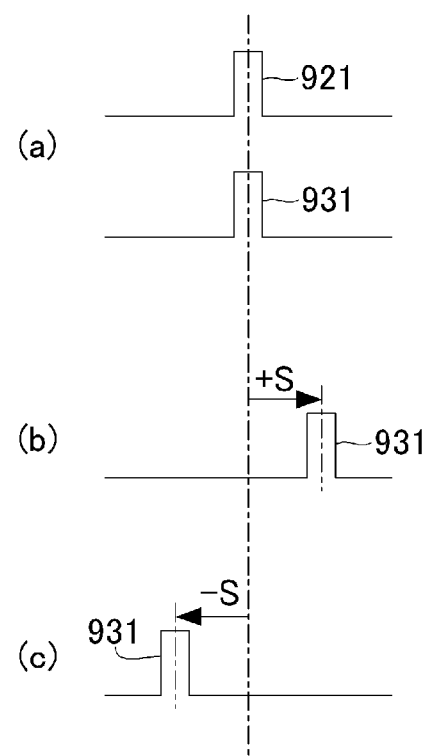
FIGS. 9(a) to 9(c) are views explaining a method for measuring the rotational torque in the tooth flank machining device of the second embodiment, where (a) shows an initial state and (b) and (c) show displacement from the initial state.

The tooth flank machining device of the second embodiment has an adjusting member 9 which is different from the members 52 and 8 used in the tooth flank machining device 10 of the first embodiment. As shown in FIG. 8, a shaft 61 which is inserted into a work gear W at one end is installed at the other end 614 to the adjusting member 9 used in the tooth flank machining device of the second embodiment as the end 614 is rotatable against a bearing not shown. The adjusting member 9 includes a torque generating motor 91 generating torque at the other end, and a first and a second measuring members 92 and 93 and a torsion buffer 94 positioned between the torque generating motor 91 and the shaft 61. The first and the second measuring members 92 and 93 are disk-shaped members coaxially rotatably mounted to a motor shaft 90 of the torque generating motor 91. The first and a second measuring members 92 and 93 may be cylindrical members having a thickness in the axial direction. The torsion buffer 94 is a torsion spring positioned between the first and the second measuring members 92 and 93 in the axial direction. The torsion buffer 94 however is not limited to the torsion spring, but may be any member as long as it has elasticity such as rubber and coil spring.

The first and the second measuring members 92 and 93 each have at least one reference point 921 or 931 in the circumferential direction. The rotational torque applied to the work tooth flank 11 of the work gear W can be adjusted by using a value of detected displacement of the two reference points 921 and 931. The reference points 921 and 931 are detected using position detection sensors 95 and 96 such as optical sensor, magnetic sensor, and image processing sensor. In FIG. 8, the reference points 921 and 931 are shaped by protruding from the disk-shaped body in the radial direction, but their shapes are not limited to protrusions. The reference points 921 and 931 may just be colors which can be recognized by images when passing through, or may be embedded magnets which cannot be recognized in appearance.

The methods of adjusting the rotational torque using the reference points 921 and 931 include, for example, one described below. Note that this is merely an example, and the present invention is not limited this. First, each position of reference points 921 and 931 is checked in a state where a work gear W does not engage a grinding wheel 2 and a torque generating motor 91 is not driven. The reference points are aligned at the axially same position, as needed (refer to FIG. 9 (a)). Next, in the disengaged state, the torque generating motor 91 is driven so that the work gear W rotates at a rotational speed at which it rotates synchronously with the grinding wheel 2. When the rotational speed of the grinding wheel 2 is N2, the number of teeth of the work gear W is Z, and the number of threads of the grinding wheel 2 is J, the work gear W rotates synchronously with the grinding wheel 2 at a rotational speed N3=N2/Z*J. The state where the reference points 921 and 931 become circumferentially displaced when the torque generating motor 91 drives the work gear W to a rotational speed N3 is defined as an initial state (no torque is applied to the work tooth flank 11 of the work gear W). After the work gear W engage the grinding wheel 2 by having the relative position adjusted by the position adjusting unit 3, and the grinding wheel 2 is rotated by the grinding wheel rotating unit controller 72, an amount of displacement of the reference point 931 from the initial state is detected (FIGS. 9(b) and 9(c)) to adjust the driving of the torque generating motor 91. The initial state may be set appropriately, for example, every time the work gear W is replaced, every fixed time, or depending on the progress of machining.

The work tooth flank 11 is machined when the torque generating motor 91 is driven in the acceleration direction to displace the reference point 931 in the normal direction (FIG. 9(b)). The other work tooth flank 12 opposite to the work tooth flank 11 is machined when the torque generating motor 91 is driven in the deceleration direction to displace the reference point 931 in the reverse direction opposite to the normal direction (FIG. 9(c)). The torque controlling unit controller 73 increases or decreases the electric power or the rotational speed of the torque generating motor to change the value of ±S from the initial state, thereby adjusting the machining pressure P.

According to the tooth flank machining device of the second embodiment, the other work tooth flank 12 of the work gear W is machined by adjusting the torque generating motor 91 of the adjusting member 9 as the rotational torque controlling unit 5 instead by switching the rotational direction of the grinding wheel rotating motor 4. This eliminates the need for remounting the work gear W with a different orientation or changing the rotational direction of the grinding wheel, and thus the both tooth flanks of the work gear W are machined efficiently.

The first and the second embodiments, the basic configuration of the present invention, have been described above with reference to FIGS. 1 to 9(c). Note that the first and the second embodiments have just described the basic concept of the tooth flank machining device according to the present invention and the gear manufacturing method carried out using the device. So, examples of specific system configuration of the tooth flank machining device according to the invention will now be described with reference to FIGS. 10 to 13.

EXAMPLE 1

Figure 10:
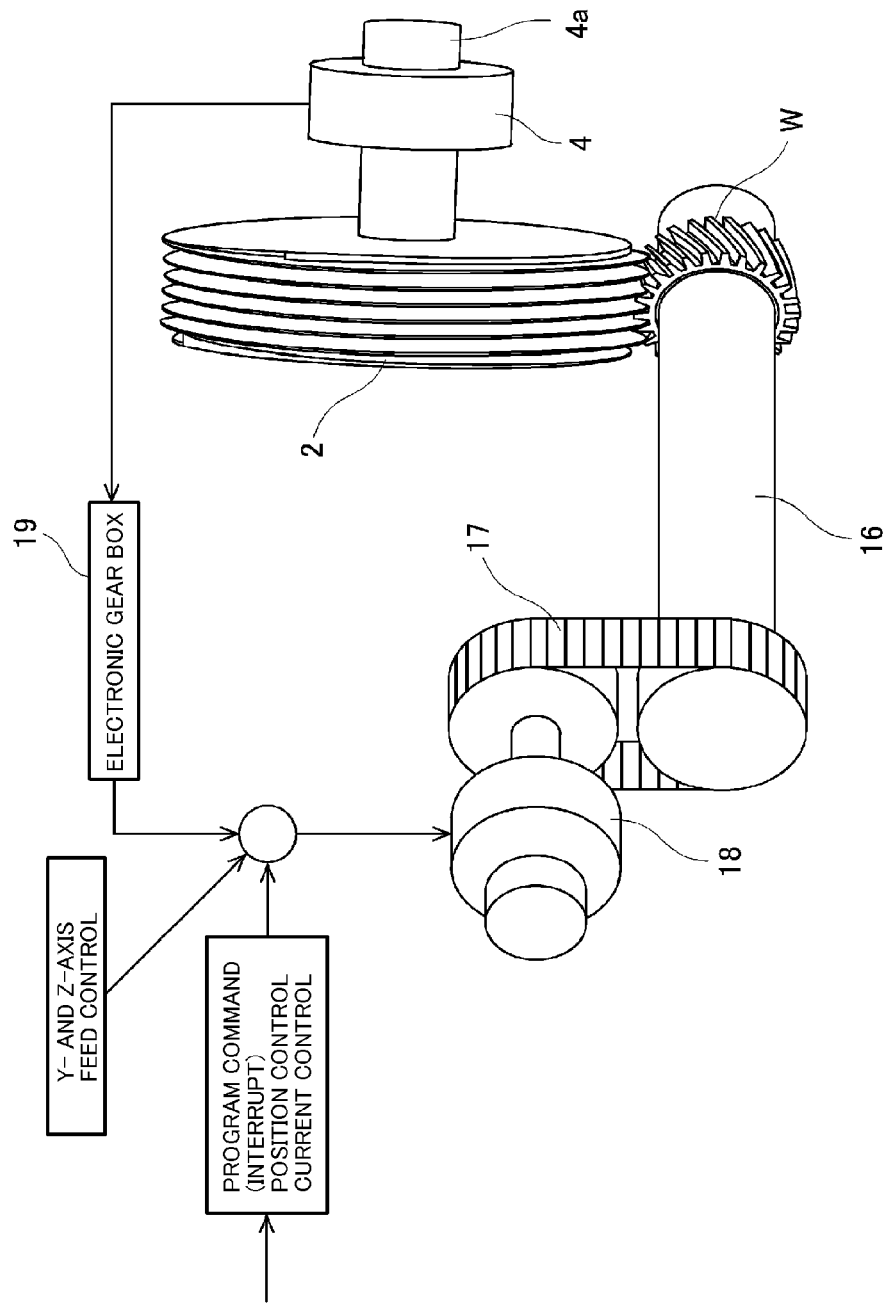
FIG. 10 is a view showing the system configuration of a tooth flank machining device of Example 1.

Here, FIG. 10 is a view showing the system configuration of the tooth flank machining device of Example 1. The tooth flank machining device of Example 1 illustrated in FIG. 10 employs a mode in which the grinding wheel 2 rotates synchronously with the work gear W.

In the tooth flank machining device of Example 1, the grinding wheel 2 is coupled to the grinding wheel rotating motor 4 as a spindle motor, and the spindle motor 4 rotationally drives the grinding wheel 2 with helical teeth. The spindle motor 4 is provided with a built-in detector 4a and keeps track of the rotation amount of the grinding wheel 2. On the other hand, the work gear W is connected via a C axis 16 and a timing belt 17 to the driving servomotor 18, by which the work gear W is also rotationally driven. The grinding wheel 2 coupled to the spindle motor 4 is connected electrically and controllably to the work gear W coupled to the driving servomotor 18 via an electronic gear box 19. The grinding wheel 2 and the work gear W can rotate synchronously with each other in the engaged state.

Also in conventional mechanisms using common numerical control for grinding, a "helical teeth grinding wheel" connected to a spindle motor engages a "work gear" coupled to a driving servomotor via an electronic gear box for synchronous rotation. With the conventional techniques however, in the cutting by the helical teeth grinding wheel, opposite tooth flanks of the work gear are simultaneously ground by cutting the work gear using another servomotor toward a radial direction of the work gear. However, the tooth flank machining device of Example 1 illustrated in FIG. 10 does not need another servomotor in the cutting by the grinding wheel 2 into the work gear W in the radial direction. That is, according to the tooth flank machining device of Example 1, synchronization "lead" and "lag" are commanded independently to the driving servomotor 18 coupled to the work gear W among the grinding wheel 2 and the work gear W, which are engaged together in synchronous rotation via the electronic gear box 19, and "cutting" (position control/current limitation) is performed in the gear engagement pitch direction, thereby pressurizing the tooth flanks of the gear one by one for grinding.

As described above, in the system configuration of the synchronous rotation mode using the electronic gear box 19, the helical teeth grinding wheel 2 and the work gear W are rotated by their own torque, allowing to apply a small stable load on the work tooth flank without being affected by, for example, the inertia or the rotational resistance of the C shaft 16. The relative machining directions of the grinding wheel 2 and the work gear W are the same, that is, right and left tooth flanks are machined under the same condition, thereby advantageously making uniform the surface quality or the surface roughness. Moreover, the device of Example 1 does not require stopping rotation or starting reverse rotation of the helical teeth grinding wheel 2, which saves energy and resources, or reduces the machining time.

EXAMPLE 2

Figure 11:
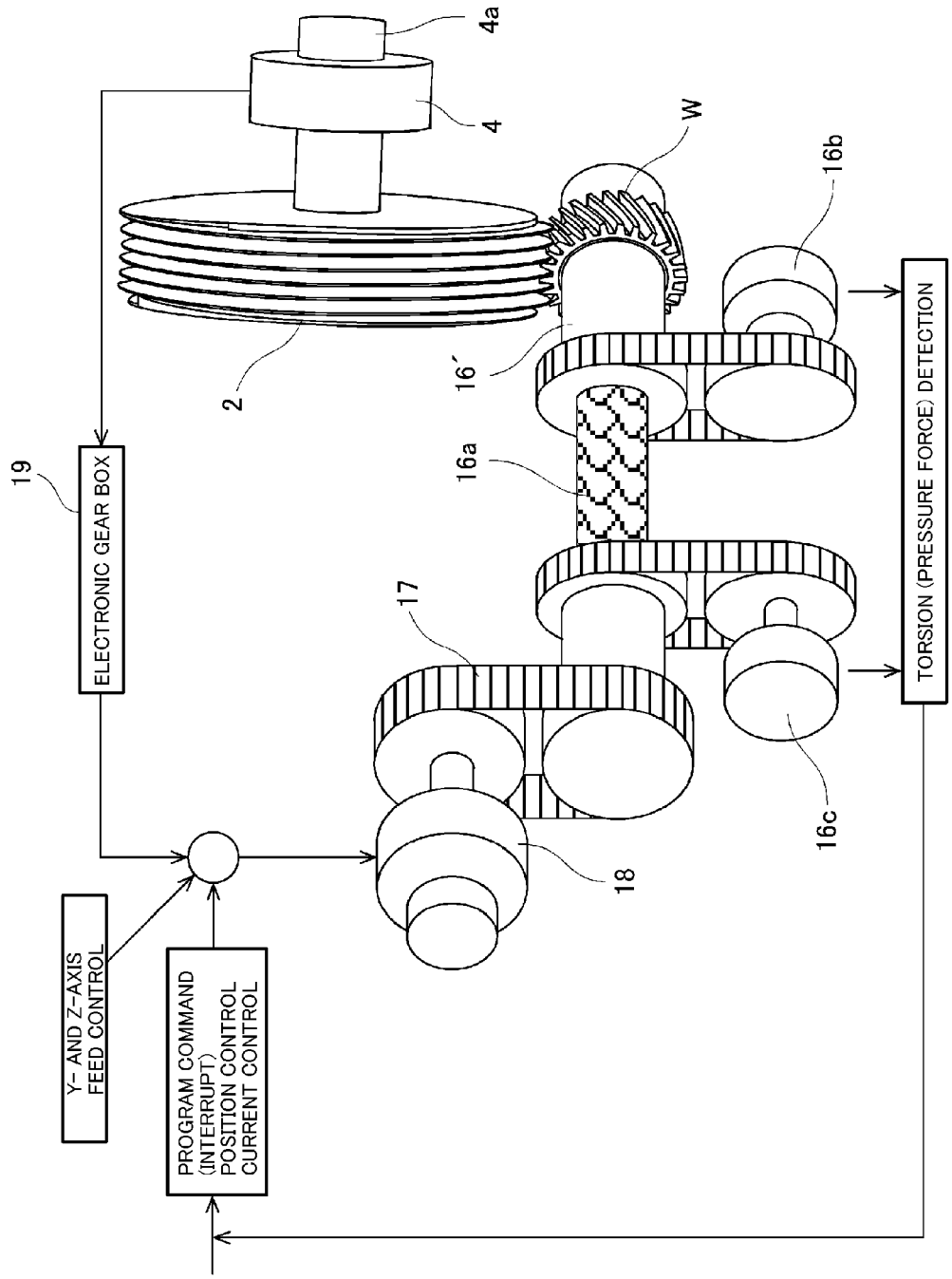
FIG. 11 is a view showing the system configuration of a tooth flank machining device of Example 2.

The tooth flank machining device of Example 1 has been described using FIG. 10. However, in the structure of Example 1, although the torque is easily controlled in the "lead" direction, controlling the torque in the "lag/deceleration" direction has room for improvement. So, as Example 2, an exemplary system configuration in which the torque is easily controlled regardless of the "lead/lag" direction will now be described. Here, FIG. 11 is a view showing the system configuration of a tooth flank machining device of Example 2. The tooth flank machining device of Example 2 illustrated in FIG. 11 also employs a mode in which the grinding wheel 2 rotates synchronously with the work gear W. The tooth flank machining device of Example 2 have the same or similar configurations and operation and effect as that of the tooth flank machining device of the Example 1, and thus different configurations and operation and effect will be mainly described hereinafter.

In the tooth flank machining device of Example 2, a torsion buffer 16*a* is provided to a C shaft 16' provided between a work gear W and a driving servomotor 18, and one position coder 16*b* or 16*c* is provided on either end of the torsion buffer 16*a*. The pair of position coders 16*b* and 16*c* measure the amount of torsion of the torsion buffer 16*a* to detect the machining torque applied to the work gear W and perform position control and current control to the driving servomotor 18. The above configuration enables adjustment of the machining pressure applied to the work gear W. As the torsion buffer 16*a* preferably used is a material which is deformed with a small force and hardly resonates, such as a spring or rubber. However, the torsion buffer 16*a* used in Example 2 is not limited to them, and may be an electric buffer, for example.

Although not shown in FIG. 11, a rotary dresser for forming grinding wheel may be provided to the tooth flank machining device of Example 2, on the rotational axis of the work gear W. The tooth flank machining device of Example 2 with the grinding wheel forming rotary dresser provided thereto can easily form a grinding wheel.

The tooth flank machining device of Example 2 may additionally have a clutch function for selecting a function of the torsion buffer 16*a* to turn on/off the function of the torsion buffer 16*a*. Turning on the clutch function and causing the torsion buffer 16*a* to function as a rigid body favorably makes the C shaft 16' serve both as an abrasive and dressing shaft.

In the above Example 2, the pair of position coders 16*b* and 16*c* measured the amount of torsion of the torsion buffer 16*a*. However, the machining torque may be measured by directly detecting the amount of deflection from a strain gauge attached to the torsion buffer 16*a*.

EXAMPLE 3

In the above Example 2, the electronic gear box 19 may be removed to achieve a configuration with reduced costs. Such a low-cost configuration will be illustrated in FIG. 12. Here, FIG. 12 is a view showing an exemplary system configuration of a tooth flank machining device of Example 3.

Figure 12:
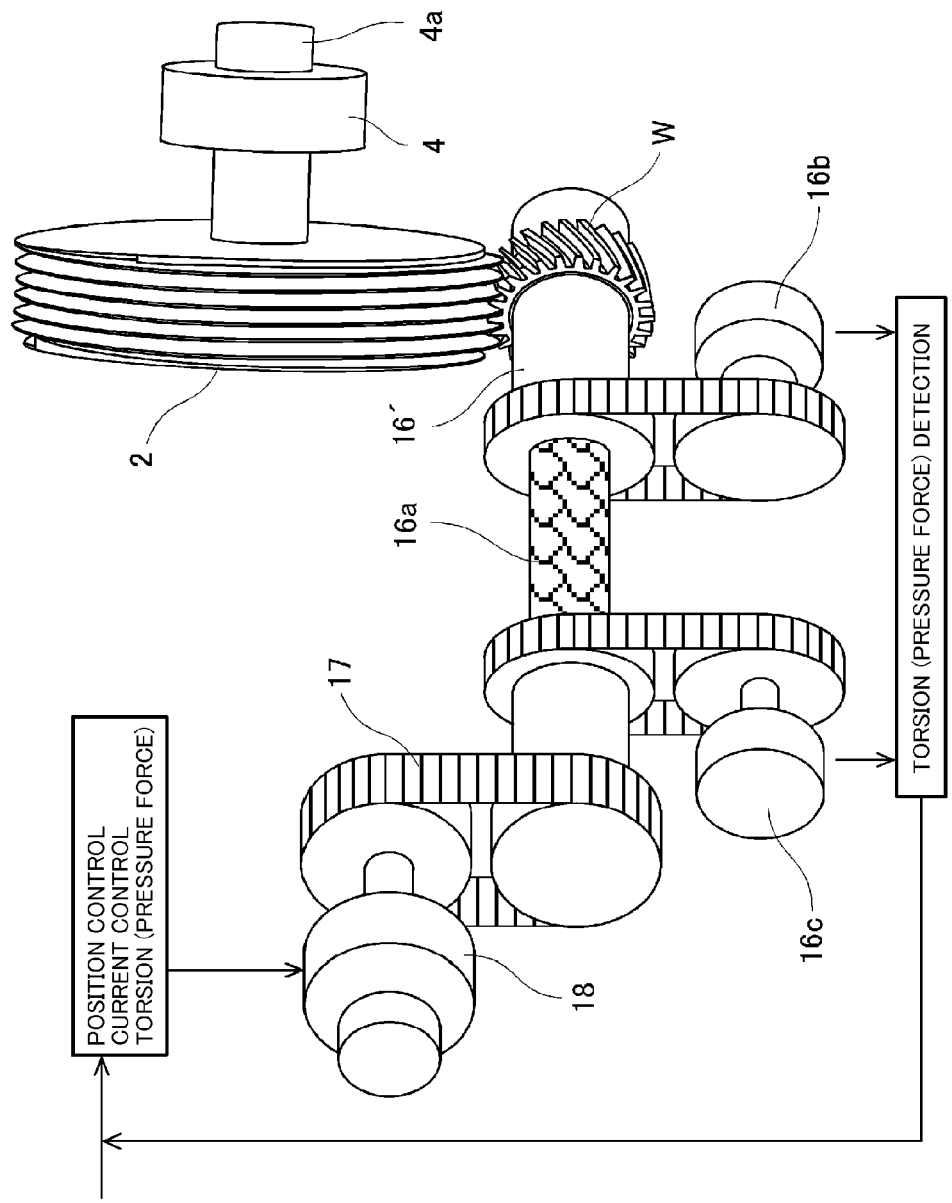
FIG. 12 is a view showing an exemplary system configuration of a tooth flank machining device of Example 3.
Figure 13:
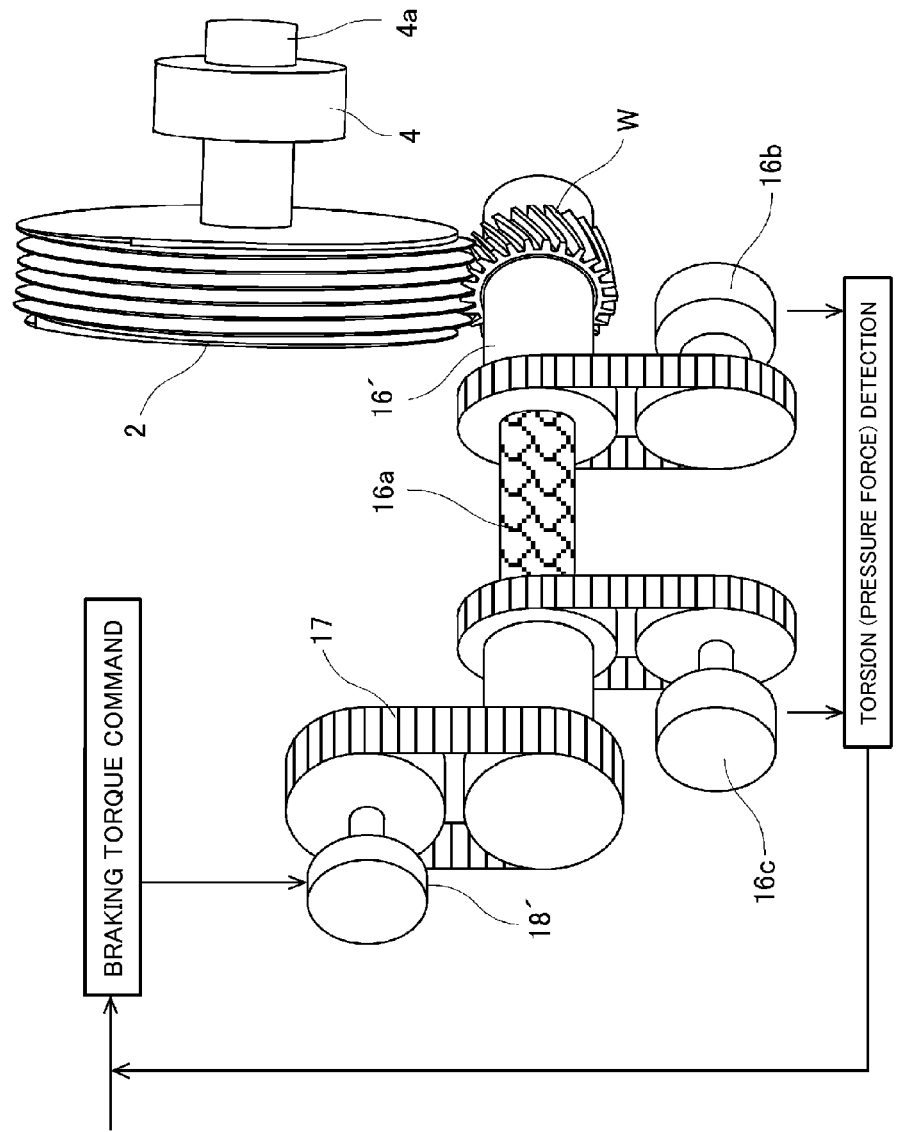
FIG. 13 is a view showing an exemplary system configuration of a tooth flank machining device of Example 4.

In the case of the tooth flank machining device of Example 3 shown in FIG. 12, the electronic gear box 19 described in Examples 1 and 2 is removed. So, in the tooth flank machining device of Example 3, "lead" and "lag" in the rotation direction are commanded independently to the driving servomotor 18 for the work gear W which is mechanically rotated synchronously by the drive force of the grinding wheel rotating motor 4, a spindle motor, and current limitation (machining torque) is commanded while cutting is performed in the gear engagement pitch direction, thereby pressurizing tooth flanks of the gear one by one for grinding. This controlling system eliminates the need for the electronic gear box 19, thereby achieving manufacturing cost reduction effect.

EXAMPLE 4

In the above described Examples 1 to 3, the drive sources were provided to both the grinding wheel 2 and the work gear W, which rotate synchronously for machining tooth flanks. However, in a tooth flank machining device of Example 4 described next using FIG. 13, the driving servomotor 18 for the work gear W and the electronic gear box 19 are removed, leaving only the grinding wheel rotating motor 4, a spindle motor, coupled to the grinding wheel 2 as the drive source. Here, on the side of the work gear W is provided braking equipment 18', which brakes against the rotational drive force of the spindle motor 4, thereby controlling machining of tooth flanks.

More specifically, in the tooth flank machining device of Example 4, a grinding wheel 2 with helical teeth engages a work gear W with backlash therebetween, the grinding wheel 2 is rotated to rotate the work gear W with the rotational force, the braking equipment 18' provided to the work gear W axis side is activated against the rotational torque based on the drag rotation to brake the work gear W, thereby pressurizing tooth flanks of the gear for grinding. In the device configuration, the work gear W is dragged along the grinding wheel 2, thereby machining tooth flanks. In the configuration of Example 4, the rotation direction of the helical teeth grinding wheel 2 needs to be switched for grinding an opposite tooth flank. The machining pressure toward gear tooth flanks can be adjusted by a method in which the braking equipment 18' detects the torque or a method in which a torsion buffer 16*a* provided to a C shaft 16' connected to the work gear W detects the torque. In Example 4, the machining pressure is adjusted more precisely by choosing the strength of the torsion buffer 16*a* (spring constant in an analogy to coil springs). Provision of the torsion buffer 16*a* allows direct control of minute torque, and thus achieves a ground surface with high precision. For the torsion buffer 16*a*, rubber, various kinds of springs, or resin may be used, the amount of deflection of which is directly measured by for example a strain gauge, thereby measuring the load. An electric buffer may be employed for the torsion buffer 16*a*.

Preferred embodiments and various Examples have been described above. However, the technical scope of the present invention is not limited to the embodiments and the like described above, which may be practiced with various modifications and improvements. For example, configurations in a first modified embodiment and the like described below may be adopted.

[First Modified Embodiment]

A grinding wheel dresser 23 of the first modified embodiment is used for forming and dressing the grinding wheel 2 which machines the work gear W in the tooth flank machining device of the first and the second embodiments.

Figure 14:
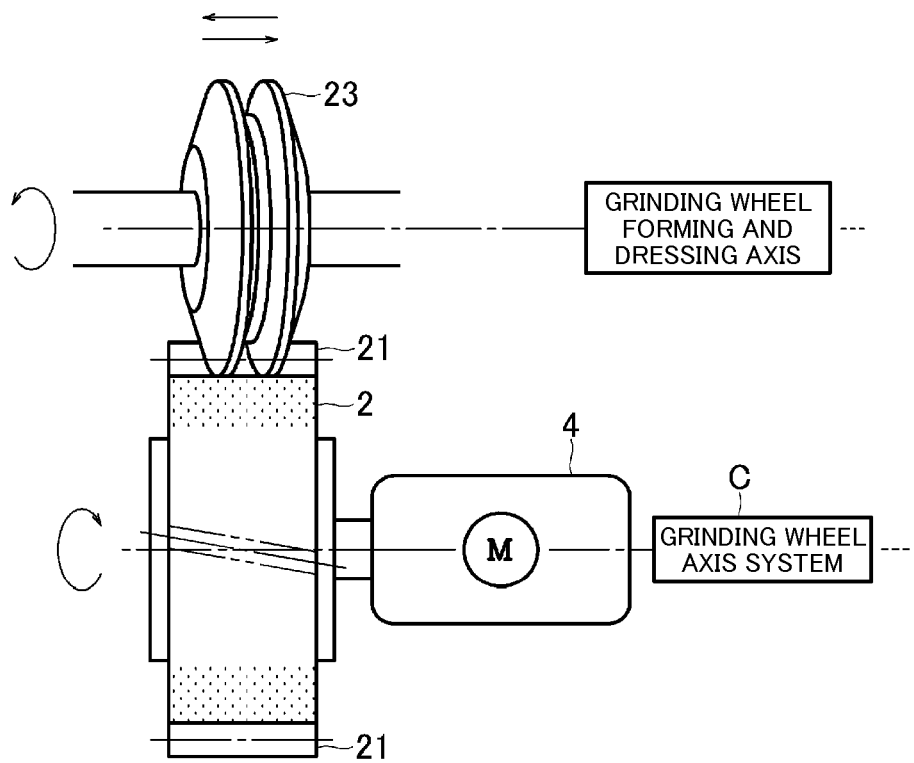
FIG. 14 is a view explaining the configuration of a grinding wheel dresser 23 used in a tooth flank machining device of a first modified embodiment.
Figure 15:
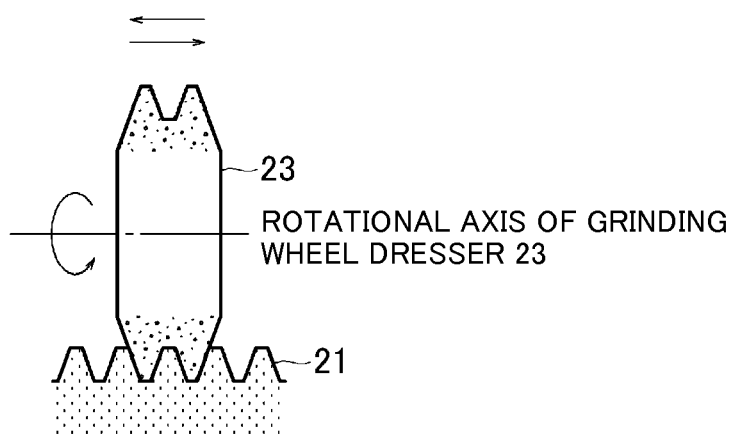
FIG. 15 is a partial cross-sectional view of FIG. 14.

As shown in FIGS. 14 and 15, a grinding wheel dresser 23 of the first modified embodiment is a diamond surfaced rotary dresser. The grinding wheel dresser 23 has a shape of two disks arranged side by side. One peak of the grinding wheel 2 is sandwiched from right and left sides by valley flanks between two adjacent peaks of the grinding wheel dresser 23 at a predetermined pressure angle.

As shown in FIG. 14, as the configuration for forming and dressing the grinding wheel 2, the grinding wheel dresser 23 is positioned along the tooth trace of the grinding wheel 2. The grinding wheel 2 is rotated about the rotational axis C by a motor 4. The grinding wheel dresser 23 is supported so as to rotate about the axis of the grinding wheel dresser 23, follows the rotation of the grinding wheel 2, and moves in the axial direction. Although not shown, the configuration also includes a means for adjusting the position of the grinding wheel dresser 23 in the direction to engage the grinding wheel 2.

Figure 16:
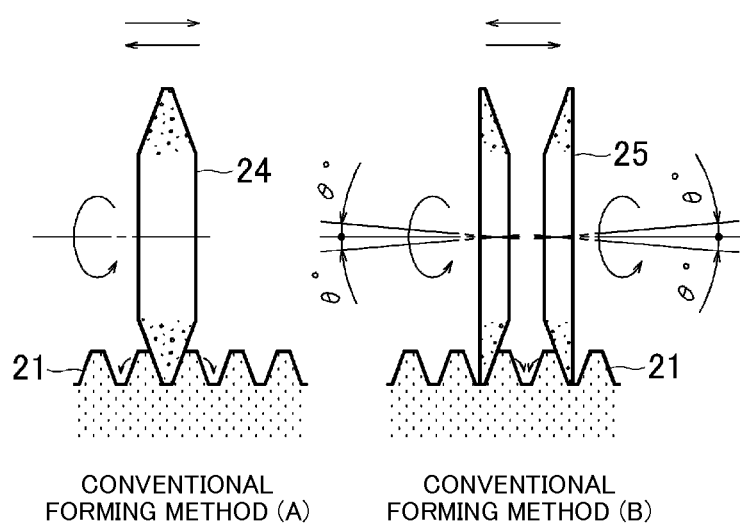
FIGS. 16(A) and 16(B) are views explaining conventional methods for forming and dressing a tooth flank of a grinding wheel.

As shown in FIGS. 16(A) and 16(B), a rotary dresser shaped like grinding wheel dressers 24 and 25 has been conventionally used in forming and dressing a grinding wheel. In the grinding wheel dresser 24 with only one peak, the peak presses one of grinding wheel tooth flanks 21 of two peaks of a grinding wheel in one direction. In the grinding wheel dresser 25 which sandwiches two adjacent peaks of a grinding wheel to be dressed for forming and dressing grinding wheel tooth flanks 21, the grinding wheel dresser 25 presses two adjacent peaks in one direction to make the peaks closer. When the grinding wheel is made of a deformable elastic material in order to comply with the shape of a work tooth flank, the grinding wheel dressers 24 and 25 deform the peaks of the grinding wheel in directions indicated by arrows in the figure, making it difficult to form and dress the grinding wheel.

However, according to the tooth flank machining device of the first modified embodiment, the two peaks of the grinding wheel dresser 23 form and dress one peak of the grinding wheel 2, which decreases the contact area and the resistance. Accordingly, the grinding wheel 2 can be formed and dressed with small power (such as electric power). The grinding wheel dresser 23 of the first modified embodiment is especially effective when the grinding wheel is made of a deformable elastic material in order to comply with the shape of a work tooth flank, where the grinding wheel is formed and dressed with one peak thereof sandwiched and restrained by the two peaks of the grinding wheel dresser 23.

[Second Modified Embodiment]

Figure 17:
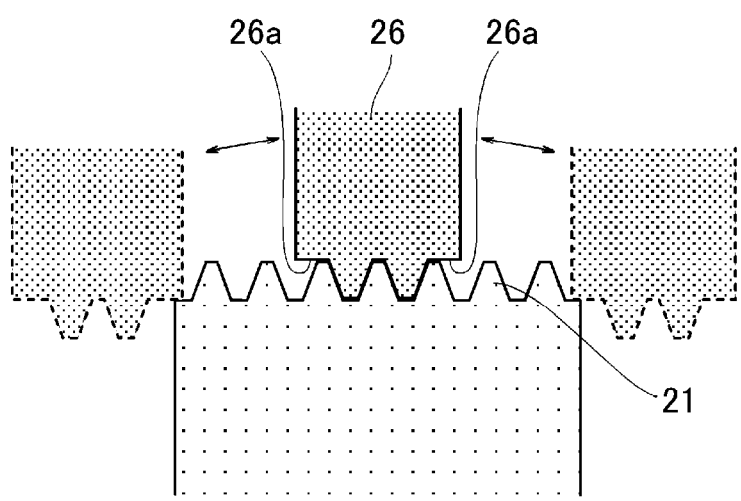
FIG. 17 is a view exemplifying a grinding wheel dresser of a second modified embodiment.

Example form of the rotary dresser as the grinding wheel dresser 23 of the first modified embodiment has been described using FIGS. 14 and 15. However, further various modifications may be employed as the grinding wheel dresser applicable to the present invention. For example, FIG. 17 is a view exemplifying a grinding wheel dresser 26 of the second modified embodiment, and in a rotary dresser illustrated in FIG. 17, both end surfaces of the grinding wheel dresser 26 has cylinder shaping portions 26a formed thereon which are equal to a small diameter of a work gear W. The rotary dresser as the grinding wheel dresser 26 of the second modified embodiment is formed as a teeth-shaped rotary dresser with two threads.

The grinding wheel dresser 26 of the second modified embodiment, which is formed as the teeth-shaped rotary dresser with two threads, forms and dresses a grinding wheel 2 very efficiently compared to conventional techniques, similarly to the grinding wheel dresser 23 of the first modified embodiment described above. The grinding wheel dresser 26 of the second modified embodiment has the cylinder shaping portions 26a at the both end surfaces, and by carrying out an operation taking advantage of the shape of the cylinder shaping portions 26a as illustrated in FIG. 17, forms and dresses the grinding wheel 2 very efficiently even compared to the grinding wheel dresser 23 of the first modified embodiment.

Although the grinding wheel dresser 26 of the second modified embodiment illustrated in FIG. 17 has a configuration having two threads, the number of threads is not limited to two, but three of them may be provided.

[Other Embodiments]

Preferred embodiments, examples, and modified embodiments have been described above. However, the present invention is not limited them. For example, the torque adjusting member 89 measure the strain of the measurement member 87 made of an elastic body to derive the rotational torque of the work gear W, but it may adopt a configuration derives the rotational torque of the work gear W by changes in position of the measurement member 87 associated with its deformation, or by measuring the amount of movement (rotation angle) of the second disk 83 instead of the measurement member 87.

Also, the vibrating unit operated in the vibrating step S6 may be one that moves the work gear W to vibrate it, or one that moves both the grinding wheel 2 and the work gear W to vibrate them.

Also, as the rotational torque controlling unit 5, instead of using a means for controlling the rotation of the work gear W, the position adjusting unit 3 may be used to merely change the relative position of the rotational axis C of the grinding wheel 2 to the rotational axis X of the work gear W. That is, the degree of abutment of the grinding wheel 2 and the work gear W can be varied by changing the relative position of the rotational axis C of the grinding wheel 2 to the rotational axis X of the work gear W. Because the machining is proceeded with the grinding wheel 2 abutting on only one of the work tooth flanks forming one teeth of the work gear W in the present embodiment, the machining pressure can be appropriately controlled only by the position adjusting unit 3.

[Additional Remark]

Another configurational characteristic of the tooth flank machining device is the grinding wheel dresser having a facewidth larger than that of the helical teeth grinding wheel, rotating following the rotation of the helical teeth grinding wheel, and following the axial movement of the helical teeth grinding wheel. Since the facewidth of the grinding wheel dresser dressing the grinding wheel tooth flank is larger than that of the grinding wheel tooth flank, the grinding wheel dresser rotates and moves in the axial direction following the helical teeth grinding wheel. Accordingly, the grinding wheel tooth flank can be dressed without adding a means for rotating and axially moving the grinding wheel dresser. The present invention can avoid a grinding burn, a crack, or damage to the grinding wheel, and thus dresses the grinding wheel tooth flank while machining the work gear with the helical teeth grinding wheel, thereby achieving high machining efficiency.

Another characteristic of the gear manufacturing method is that the machining device includes the grinding wheel dresser having a facewidth larger than that of the helical teeth grinding wheel, rotating following the rotation of the helical teeth grinding wheel, and following the axial movement of the helical teeth grinding wheel. According to the method, since the facewidth of the grinding wheel dresser dressing the grinding wheel tooth flank is larger than that of the grinding wheel tooth flank, the grinding wheel dresser rotates and moves in the axial direction following the helical teeth grinding wheel. Accordingly, the grinding wheel tooth flank can be dressed without adding a means for rotating and axially moving the grinding wheel dresser. The present invention can avoid a grinding burn, a crack, or damage to the grinding wheel, and thus dresses the grinding wheel tooth flank while machining the work gear with the helical teeth grinding wheel, thereby achieving high machining efficiency.

REFERENCE SIGNS LIST

10: Tooth flank machining device, W: Work gear, 11: Work tooth flank, 12: Other work tooth flank, 16,16': C shaft, 16a: Torsion buffer, 16b, 16c: Position coder, 17: Timing belt, 18: Driving servomotor, 18': Braking equipment, 19: Electronic gear box, 2: Grinding wheel (Helical teeth grinding wheel), 21: Grinding wheel tooth flank, 23, 26: Grinding wheel dresser, 24, 25: Grinding wheel dresser (Conventional), 3: Position adjusting unit, 4: Grinding wheel rotating unit (Spindle motor), 4a: Built-in detector, 5: Rotational torque controlling unit, 51: Holding member, 511: Body, 512: Bearing, 52: Adjusting member, 521: Oil seal, 6: Work gear supporting unit, 61: Shaft, 611: End, 612: Flange, 613: Screw hole, 614: Other end, 615, 616: Holding rotating shaft, 62: Pressing member, 621: Through hole, 63: Fastening member, 631: Screw, 632: Washer, 7: Controlling unit, 71: Relative position controller, 72: Grinding wheel rotating unit controller, 73: Torque controlling unit controller, 74: Vibration controller, 8: Adjusting member, 80: Case, 81: First disk, 82: Friction material, 83: Second disk, 84: Bearing, 85: Coil Spring, 85, 86: Stopper, 87: Measurement member, 871: Auxiliary member, 872: Fastening member, 88: Auxiliary disk, 89: Torque adjusting member, 9: Adjusting member, 90: Motor shaft, 91: Torque generating motor, 92: First measuring member, 921, 931: Reference point, 93: Second measuring member, 94: Torsion buffer, 95, 96: Position detection sensor

The invention claimed is:

1. A tooth flank machining device comprising:
a helical teeth grinding wheel supported so as to be rotatable about a rotational axis;
a work gear supporting unit supporting a work gear so as to be rotatable about a rotational axis;
a position adjusting unit capable of moving a relative position of the rotational axis of the helical teeth grinding wheel to the rotational axis of the work gear;
a grinding wheel rotating unit rotating the helical teeth grinding wheel;
a rotational torque controlling unit controlling rotational torque of the work gear; and
a controlling unit having a relative position controller activating the position adjusting unit to adjust the relative position of the rotational axis of the helical teeth grinding wheel to the rotational axis of the work gear so that the helical teeth grinding wheel engages the work gear with a grinding wheel tooth flank of the helical teeth grinding wheel abutting on only one of work tooth flanks forming a tooth of the work gear, a grinding wheel rotating unit controller activating the grinding wheel rotating unit, and a torque controlling unit controller activating the rotational torque controlling unit to adjust the rotational torque within a predetermined range.

2. The tooth flank machining device according to claim 1, wherein the helical teeth grinding wheel is made of a deformable elastic material in order for the grinding wheel tooth flank to comply with a shape of the work tooth flank.

3. The tooth flank machining device according to claim 1 wherein
the grinding wheel rotation unit controller rotates the grinding wheel rotating unit, and
the rotational torque controlling unit controller switches direction of the rotational torque to rotate the work gear into one direction and the other and machines the one and the other work tooth flanks of the work gear.

4. The tooth flank machining device according to claim 1, wherein the helical teeth grinding wheel has a tooth thickness smaller than a width of a tooth space of the work gear.

5. The tooth flank machining device according to claim 1, wherein the controlling unit has a vibration controller activating the position adjusting unit to vibrate at least one of the helical teeth grinding wheel and the work gear.

6. The tooth flank machining device according to claim 1, further comprising a grinding wheel dresser having a shape of at least a pair of adjacent peaks, and forming and dressing the grinding wheel tooth flank while restraining a peak of the grinding wheel with a valley formed by the pair of peaks.

7. The tooth flank machining device according to claim 6, wherein both end surfaces of the grinding wheel dresser have cylinder shaping portions formed thereon which are equal to a small diameter of the work gear.

8. The tooth flank machining device according to claim 1, wherein the work gear supporting unit rotatably supporting the work gear is provided with a torsion buffer generating an amount of torsion.

9. A gear manufacturing method using a machining device including a helical teeth grinding wheel supported so as to be rotatable about a rotational axis and a work gear supporting unit supporting a work gear so as to be rotatable about a rotational axis, the method comprising:
a position adjusting step adjusting a relative position of the rotational axis of the helical teeth grinding wheel to the rotational axis of the work gear so that the helical teeth grinding wheel engages the work gear with a grinding wheel tooth flank of the helical teeth grinding wheel abutting on only one of work tooth flanks forming a tooth of the work gear;
a grinding wheel rotating step rotating the helical teeth grinding wheel; and
a rotational torque controlling step adjusting rotational torque of the work gear within a predetermined range in the course of the grinding wheel rotating step.

10. The gear manufacturing method according to claim 9, wherein the helical teeth grinding wheel is made of a deformable elastic material in order for the grinding wheel tooth flank to comply with a shape of the work tooth flank.

11. The gear manufacturing method according to claim 9, wherein
The helical teeth grinding wheel is rotated in the grinding wheel rotating step, and
direction of the rotational torque is switched to rotate the work gear into one direction and the other and the one and the other work tooth flanks of the work gear is machined in the rotational torque controlling step.

12. The gear manufacturing method according to claim 9, wherein the helical teeth grinding wheel has a tooth thickness smaller than a width of a tooth space of the work gear.

13. The gear manufacturing method according to claim 9, wherein
in the grinding wheel rotating step, at least one of the helical teeth grinding wheel and the work gear is vibrated, and further
a vibrating step changing the relative position of the rotational axis of the helical teeth grinding wheel to the rotational axis of the work gear is performed.

14. The gear manufacturing method according to claim 9, wherein a grinding wheel dressing step is performed using a grinding wheel dresser having a shape of at least a pair of adjacent peaks, the step forming and dressing the grinding wheel tooth flank while restraining a peak of the grinding wheel with a valley formed by the pair of peaks.

15. The gear manufacturing method according to claim 14, wherein
- both end surfaces of the grinding wheel dresser have cylinder shaping portions formed thereon which are equal to a small diameter of the work gear, and
- the grinding wheel dressing step includes forming and dressing the grinding wheel tooth flank using the cylinder shaping portions.

16. The gear manufacturing method according to claim 9, wherein the work gear supporting unit rotatably supporting the work gear is provided with a torsion buffer generating an amount of torsion.

\* \* \* \* \*